United States Patent [19]

Wagner et al.

[11] 4,392,892

[45] Jul. 12, 1983

[54] PROCESS FOR SEPARATING HYDROCARBONS FROM PARTICULATE SOLIDS

[75] Inventors: Fritz Wagner, Stöckheim; Walter Lindörfer, Kassel; Wilhelm Jahn-Held, Staufenberg; Walther Schulz, Vechta, all of Fed. Rep. of Germany

[73] Assignees: Wintershall Aktiengesellschaft, Kasel; Gesellschaft fur Biotechnologische Forschung, Braunschweig-Stockheim, both of Fed. Rep. of Germany

[21] Appl. No.: 307,092

[22] Filed: Sep. 18, 1981

Related U.S. Application Data

[63] Continuation of Ser. No. 82,631, Oct. 5, 1979, abandoned.

[30] Foreign Application Priority Data

Oct. 6, 1978 [DE] Fed. Rep. of Germany ....... 2843685

[51] Int. Cl.³ ............................................... B08B 3/08
[52] U.S. Cl. ....................................... 134/25.1; 134/40
[58] Field of Search .................. 134/25.1, 40; 210/922, 210/925

[56] References Cited

U.S. PATENT DOCUMENTS 3,688,781  9/1972  Talley ............................. 175/208 X
3,693,733  9/1972  Teague ............................ 175/206 X
3,996,134  12/1976  Osborn et al. .......... 210/DIG. 27 X

FOREIGN PATENT DOCUMENTS 2646507  4/1978  Fed. Rep. of Germany .

*Primary Examiner*—Marc L. Caroff
*Attorney, Agent, or Firm*—Florence U. Reynolds

[57] ABSTRACT

Oils or petroleum hydrocarbons are separated from solid or solid/liquid mixtures thereof with soil, sand or oil processing residues, by treating these oil-containing mixtures with an aqueous solution or dispersion of a crude extract of microbially produced glycolipids and separating the oil-containing phase from the aqueous phase.

11 Claims, No Drawings

PROCESS FOR SEPARATING HYDROCARBONS FROM PARTICULATE SOLIDS

This is a continuation of application Ser. No. 82631 filed Oct. 5, 1979, now abandoned.

Throughout the world, technology is being used in an attempt to increase the petroleum supplies by improving various technical recovery methods. These include methods of recovering petroleum from oil-bearing sand.

An equally important aim of present technology is to eliminate oil pollution such as that which may occur on river banks and beaches as a result of tanker accidents or human error, by separating the petroleum hydrocarbons from such soil and/or sand contaminated with oil.

A further aim of technology is to separate the oily components from oil-containing residues, especially those resulting from petroleum processing, so as to avoid having to eliminate this oil content by dumping or burning it off. There are considerable problems involved in the disposal of large quantities of soil and/or sand contaminated with oil. Burning off oils to produce oil-free residues not only has the disadvantage of transporting the material to the burning plant but also leads to pollution of the environment with combustion gases which contain $SO_2$ and $CO_2$ or, if combination is incomplete, leads to the production of noxious fumes.

Particular technical problems arise in conjunction with leakages from large-capacity tankers near the coast for the soil or sand on the beaches which may be thus polluted. The removal of such oil pollution on long stretches of coast is very expensive, in terms of collecting and disposing of or burning off the oil-containing soil or sand. Moreover, if the substrate and lateral boundaries are inadequately sealed off, the dumping of such oil-containing materials can have damaging environmental consequences which are usually hard to control, for example, the contamination of the water table.

The difficulties and time taken in removing oil from oil-containing soil or sand and the dumping of this soil and sand and oil-containing residues may cause considerable disruption of the ecological balance of nature and damage the human environment.

Consequently, there is a need to find a method of removing the bonded oil phase from soil, sand or residues which is easy to carry out, and is an improvement on the known, technically complex methods without suffering from the same disadvantages.

A process for separating oils or petroleum hydrocarbons from solid or solid/liquid material has been found. In this method, the soil, sand or oil-containing residues which contain the oils or petroleum hydrocarbons are impregnated with a quantity of a solution or dispersion of microbially-produced glycolipids such that the oil phase or emulsion thereof leaving the capillaries rises out of the aqueous phase and is separated from the aqueous phase and from the solid phase.

With the invention, it is possible to effect separation of the bonded oil phase from soil and/or sand or residues so that the oil phase is rapidly separated almost totally from the solid or solid/liquid phase with the shortest possible transporting distances. It is then possible to dump or distribute the practically oil-free materials without any danger to nature or to the environment.

The process according to the invention also has the advantage of enabling the ecological balance of nature to be re-established to a great extent as quickly as possible and also reducing or preventing damage to water and air as far as possible.

To solve this problem of separating the oil phase, the process of the invention uses aqueous solutions or dispersions of glycolipids prepared by microbial methods.

From DE-PS No. 24 10 267, it is already known to add active substances from microbially produced culture solutions to flood water in order to recover petroleum during secondary recovery.

To increase the oil yield when petroleum deposits are flooded, it is also known from DE-OS 26 46 506 to use non-ionic, interfacially active agents. It is also proposed to use aqueous dispersions of glycolipids of specific structures as additives to the flood water. However, the possibility of using glycolipids to separate oil phases from soil and/or oil-containing residues could not be inferred from this. This is due to the fact that, until now, only the addition of glycolipids to the flood water for introduction into the petroleum-containing deposits has been thought possible. Soil and sand and processing residues are not deposits, in the sense of secondary recovery. Rather, these soils, sands and residues have different structures. These materials are not rocks but consist of particles located adjacent to one another which form cavities and capillaries between the particles. Such materials can be rendered mobile by introducing or increasing the aqueous phase, without any mechanical breaking-up. In contrast, oil-bearing rocks have a structure, which may have capillaries running through it, but which must first be broken up mechanically before the process of the invention can be performed.

According to our own tests, sugar esters synthesized, for example, by the method in U.S. Pat. No. 4,032,702 do not effect separation of the oil phase from solid and/or solid/liquid materials.

This new aim is achieved with the utilization of substances in the process according to the invention, these being glycolipids which may be prepared by microbial production, preferably mono- or di-esters of $\alpha\alpha'$-trehalose with long chained $\alpha$-alkyl-$\beta$-hydroxy- fatty acids. They may be obtained by the action of the microorganisms *Nocardia rhodochrous* species or *Mycobacterium phlei* from a mixture of alkanes with 12 to 19 carbon atoms in the molecule or from crude oil. It is not certain why only these microbially obtained metabolites are suitable for the process of the invention. It may be that, in addition to these glycolipids, the crude extract also contains other metabolites which act as solubilizing agents or which increase the specific activity. Therefore, the technical effect of the process of the invention was unexpected.

Another reason that the process of the invention is not obvious is the use of a special technique for separating the oil phase from the oil-containing mixtures. Only when these measures for carrying out the process of the invention became known was it possible to investigate the technical effect of the use of such glycolipids.

These measures consist in establishing a ratio of solid to liquid phase such that the oil phase can emerge from the cavities and capillaries to the oil-containing soil and/or sand or residues and rise out of the aqueous phase.

This can be achieved by impregnating the oil-containing mixtures with an aqueous solution or dispersion of the microbially produced glycolipids, preferably in a concentration of from 0.01 to 5.0 g/l. The solution or dispersion may be introduced from below or laterally.

A mixture of water and a dispersion of glycolipids or these components may be added simultaneously or separately to ensure that the oil phase leaving the cavities and capillaries of the soil, sand or residues rises up out of the aqueous phase. Oil splitting agents may also be added to the oil phase.

However, the liberated oil phase can also be separated by gravity separation or flotation separation. Gravity separation may be effected by adding a sufficient quantity of water or aqueous salt solution or sea water to the solid/aqueous oil-containing phase to bring about fairly rapid rising of the specifically lighter oil phase. Flotation separation may be effected by blowing in air to bring about attachment of the oil droplets to air bubbles thus causing fairly rapid ascension of the oil phase.

Only by using these measures according to the invention was it possible to take advantage of the technical effect of using microbially produced glycolipids. Thus, the process of the invention is a combination of using specific substances and specific procedures. This is why, until now, technology has succeeded only in separating oil from the aqueous phase, as in the case of oil spillages, by using oil-specific adsorption agents.

For this purpose, it is proposed to use the chemical agent consisting of hydrophobic, thermally expanded vermiculite or perlite, according to DE-PS No. 1 167 278, which selectively adsorbs the oil floating on the water so that the solid phase saturated with the oil can be separated off.

With the process according to the invention, on the other hand, the oil phase is liberated from solid and/or solid/liquid materials and then separated off. No solid chemical adsorption agents are required. The oil phase can be skimmed off or removed by suction. In a continuous method, the oil phase can also be made to flow away through an overflow with a certain amount of residual water.

Thus, the use of oil-selective adsorption agents according to the prior art does not anticipate the procedure used in the process according to the invention. Rather, the technique of clearing up oil spillages has been restricted to this method, and the wider aims of the process according to the invention have not previously been attempted.

The process of the invention is also applicable to oil-containing materials which first have to be broken up to convert them into the same state as oil-containing soil and/or sand. Thus, the process according to the invention has a wide field of application.

The apparatus for performing the process of the invention enables various technologies to be used, both below and above ground level. This is true irrespective of the circumstances of the oil spillage, the width of the beach, the water table and the location of the water level at ebb and flood tides. However, once these technologies are known, it is within the capabilities of the expert to use the most appropriate solution.

The process according to the invention has an added technical advantage in that the oil phase can rapidly be separated from the oil-containing materials, such as oil sand, continuously and discontinuously.

It also has the advantage that the dispersion of microbially-produced glycolipids to be used can be produced and stored at any time, independently of times of need.

One advantage of the process according to the invention is that it can be carried out in simple containers or in known flotation apparatus. Only simple apparatus is required, such as a feed for the oil-containing material and the dispersion containing the glycolipids, an overflow or suction means for removing the separated oil and a pump for conveying the oil-free material, such as sand, with the aqueous phase.

Therefore, the process according to the invention does not require any great capital investment. This advantage is significant in that the time, place and quantity of oil to be removed are frequently not known in advance and cannot be planned. However, the maximum capacity of an oil spillage and hence the required quantity of dispersion containing glycolipid can be estimated.

A further advantage is that this dispersion can be stored in the vicinity of possible places where it will be used.

Another technical advantage of the process according to the invention is that it can be carried out discontinuously in chambers built from oil-containing and oil-free wall material at various intervals above or below ground.

The process of the invention and the apparatus for performing it present the first opportunity of making oil-containing solid and solid/liquid materials such as oily sand resulting from oil spillages in coastal areas virtually completely oil-free very rapidly, without any need to dispose of the oil-containing material or transport it to a combustion plant with its polluting effects.

The technical effects of the process according to the invention are shown by the following examples:

EXAMPLE 1

A 700 liter bioreactor fitted with a Kaplan turbine and cylindrical guide member is filled with 500 l. of nutrient solution with the following composition: 1000 g of $(NH_4)_2SO_4$, 500 g of $KH_2PO_4$, 1000 g of $K_2HPO_4.3H_2O$, 500 g of $Na_2HPO_4.2H_2O$, 250 g of KCl, 100 g of $MgSO_4.7H_2O$, 100 g of yeast extract dissolved in 500 l. of fresh water and 10 kg of an n-alkane mixture with a chain length of $C_8$ to $C_{24}$, then it is inoculated with 50.1 of inoculum from a *Nocardia rhodochrous* culture, and cultivated at 32° C. at a aeration rate of 1.0 vol/vol/min at a revolution rate of 1,800 rpm and at a pressure in the reactor of 2 bars.

During cultivation, the submersed culture is automatically adjusted to a pH of 6.8 by a pH regulating means, by the addition of a 25% by volume ammonia solution. After 32 hours, the submersed culture is transferred into a counterflow extraction apparatus and extracted exhaustively with 200 l. of extracting agent consisting of 180 l. of methylene chloride and 20 l. of methanol. After the extraction agent has been evaporated off, 1.22 kg of glycolipid-containing crude extract are obtained which are used to prepare the aqueous dispersion.

The crude extract contains the following glycolipids as its main constituents:

192 g of 6,6'-di-O-α-tricanyl-β-hydroxy-docosanoyl-αα'-trehalose 178 g of 6,6'-di-O-α-dodecanyl-β-hydroxy-docosanoyl-αα'-trehalose 144 g of 6,6'-di-O-α-decanyl-β-hydroxy-pentacosanoyl-αα'-trehalose

EXAMPLE 2

An aqueous dispersion of the crude extract of the glycolipids according to Example 1, in a concentration of 100 mg/l, is added from above to wet, oil-containing sand (from an oil spillage in a coastal region) in a round container, until the sand is soaked through and the oil phase is able to emerge from the cavities and capillaries and rise up rapidly. The oil phase floating on the surface is separated from the aqueous phase of the sea water. The aqueous phase, which also contains the now oil-free sand, is then pumped out of the container. The sand separated therefrom is practically oil-free and has no appreciable oil content, nor a detectable smell of oil.

We claim:

1. A process for separating oils or petroleum hydrocarbons from solid or solid/liquid mixtures thereof with particles of soil, sand or petroleum processing residues, which comprises the steps of (a) mixing said oil-containing mixture with an aqueous solution or dispersion of a crude extract of microbially produced glycolipids to form a slurry, said extract being obtained by a method consisting essentially of the steps of extracting a microbial culture solution with a solvent for glycolipids and evaporating the solvent from the extract; and (b) adding water, an aqueous salt solution or sea water to the slurry in an amount sufficient to cause a rapid rising of an oil phase from an aqueous phase; and (c) separating the oil phase from the aqueous phase, whereby said particles are rendered substantially oil-free.

2. The process according to claim 1, wherein said glycolipids are produced by microorganisms from a mixture of alkanes with 12 to 19 carbon atoms in the molecule or from crude oil.

3. The process according to claim 1, wherein said glycolipids are mono- and diesters of $\alpha,\alpha'$-trehalose and long-chained $\alpha$-alkyl-$\beta$-hydroxy fatty acids.

4. The process according to claim 1, wherein said glycolipids are produced by the microorganisms *Nocardia rhodochrous* species or *Mycobacterium phlei* from a mixture of alkanes with 12 to 19 carbon atoms in the molecule or from crude oil.

5. The process according to claim 1, wherein said glycolipids are used in the form of an aqueous solution or dispersion containing said glycolipids, in a concentration of from 0.01 to 5.0 g/l.

6. The process according to claim 5, wherein the solution or dispersion of glycolipids is sprayed onto the oil-containing mixtures.

7. The process according to claim 5, wherein the solution or dispersion of glycolipids is introduced into the oil-containing mixtures from below or laterally.

8. The process according to claim 1, wherein sea water or water enriched with rock salt is added to the oil-containing mixture in order to increase the difference between the specific gravities of the aqueous phase and the oil phase.

9. The process according to claim 7, wherein the separation of the oily phase is effected by flotation separation, by adding a sufficient quantity of water to the oily mixture to bring about the attachment of the oil droplets to air bubbles, by blowing air in, and thus causing fairly rapid ascension of the oil phase.

10. The process according to claim 7, wherein the introduction of the oil-containing soil and/or sand or residues is effected with a mixture of water and a dispersion of the crude extract of glycolipids or these components are simultaneously or separately added in sufficient quantities to ensure that the oil phase leaving the cavities and capillaries of the soil, sand or residues rises up out of the aqueous phase, the ratio of glycolipids to oil being designed to ensure practically total separation of the oil phase.

11. The process according to claim 1, wherein oil splitting agents are added to the oil phase.

* * * * *